B. B. WELLS.
CHECK PRINTER ATTACHMENT FOR CASH REGISTERS.
APPLICATION FILED JUNE 30, 1910.
1,151,747. Patented Aug. 31, 1915.
5 SHEETS—SHEET 1.
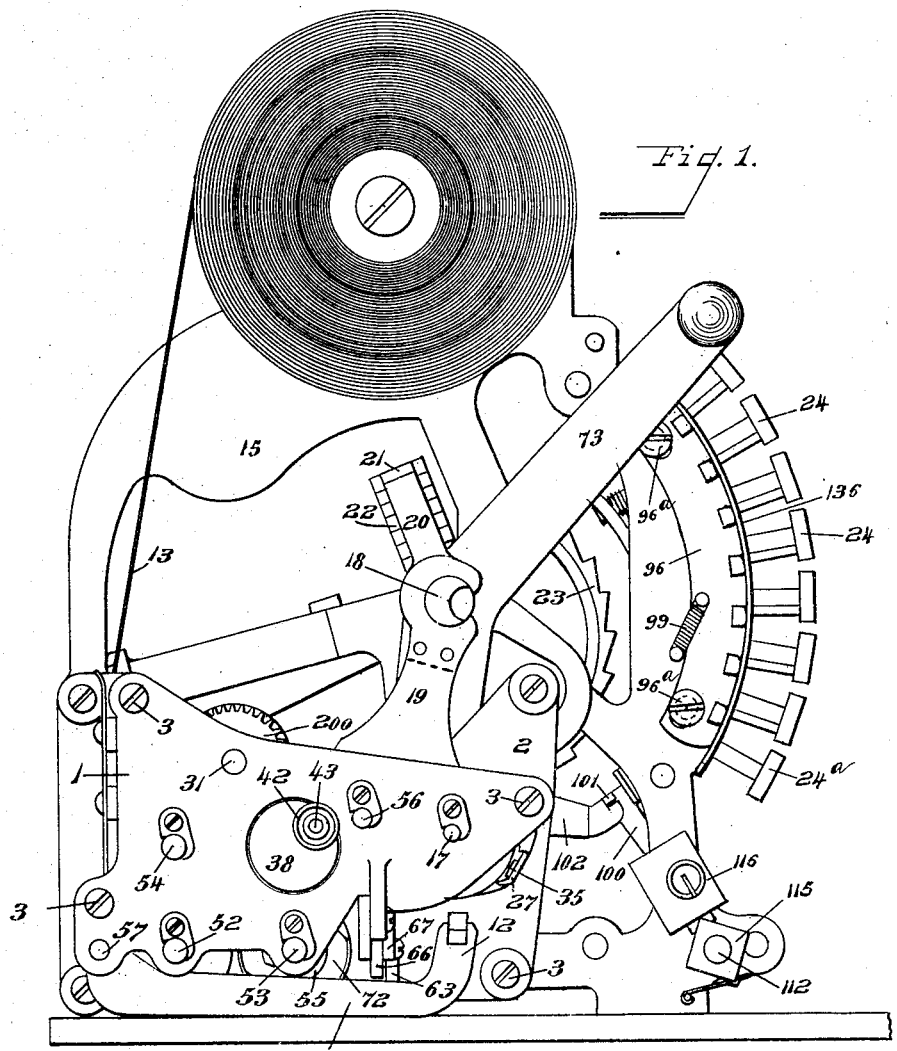
Fig. 1.
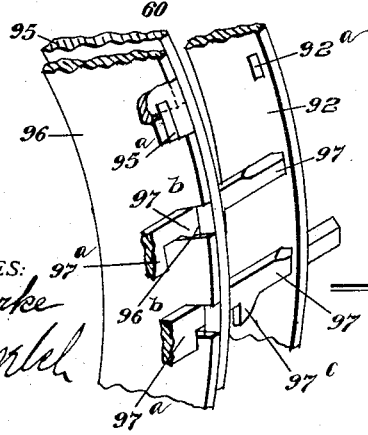
Fig. 18.
INVENTOR.
BY
ATTORNEYS.

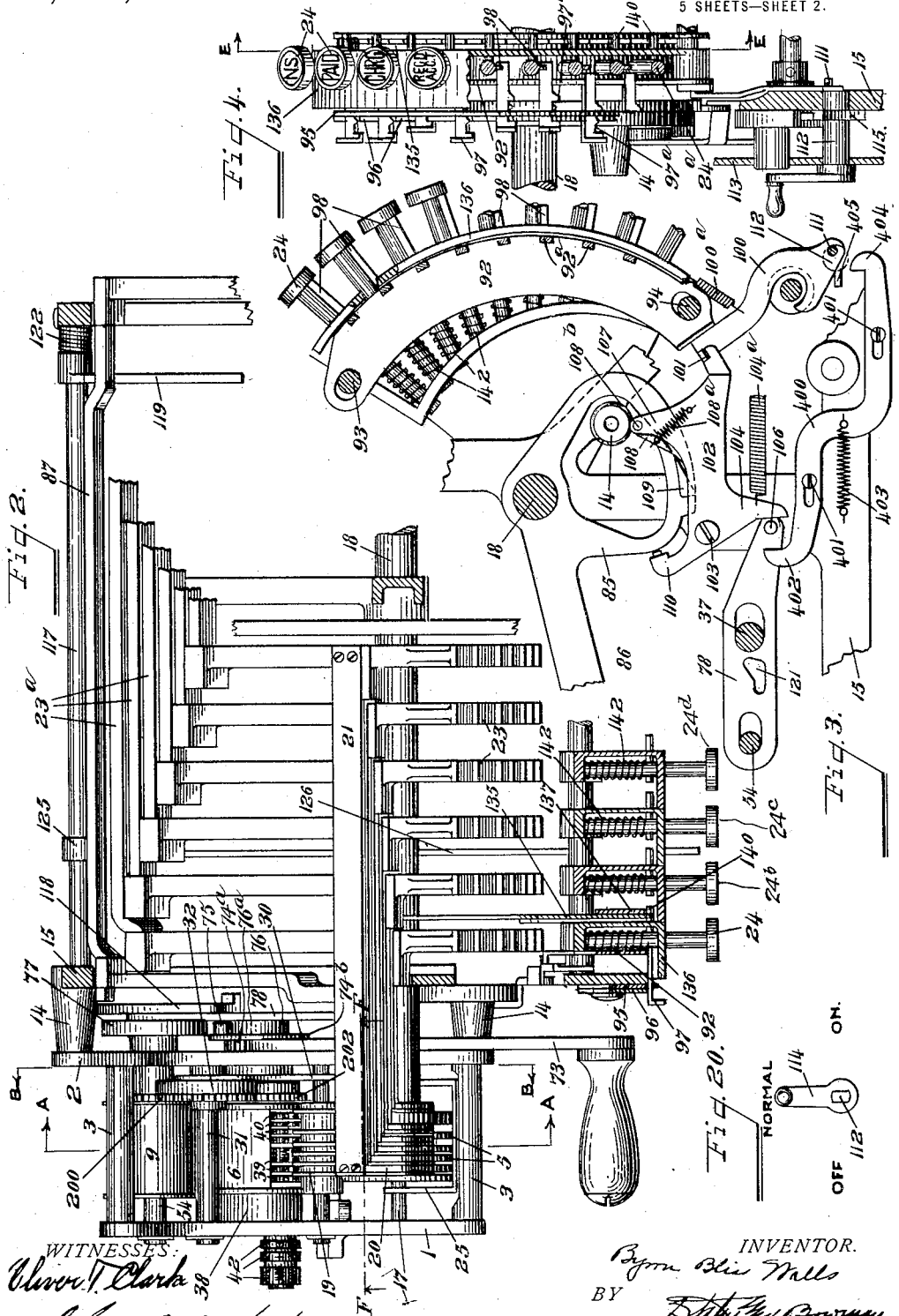

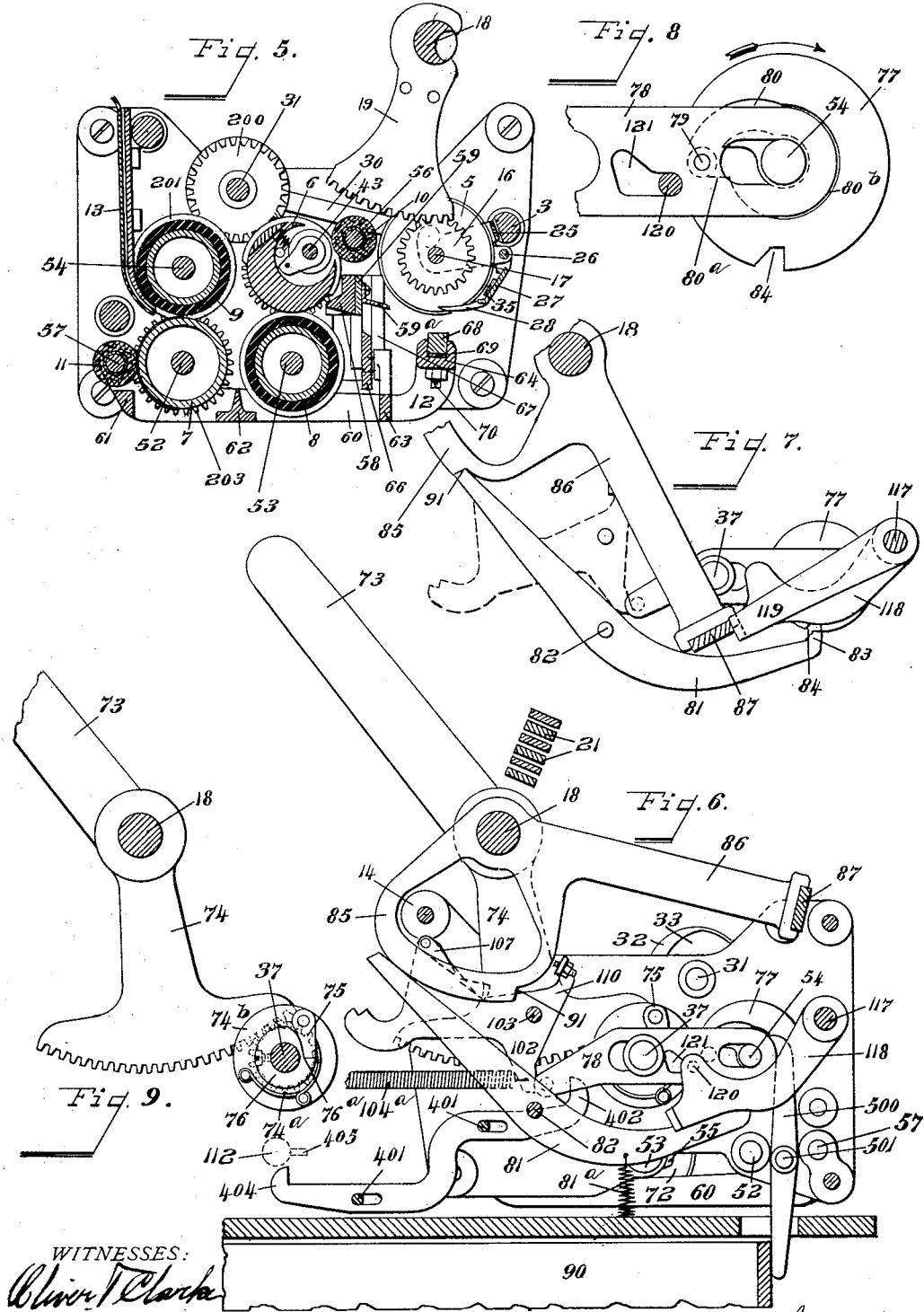

B. B. WELLS.
CHECK PRINTER ATTACHMENT FOR CASH REGISTERS.
APPLICATION FILED JUNE 30, 1910.
1,151,747.
Patented Aug. 31, 1915.
5 SHEETS—SHEET 4.
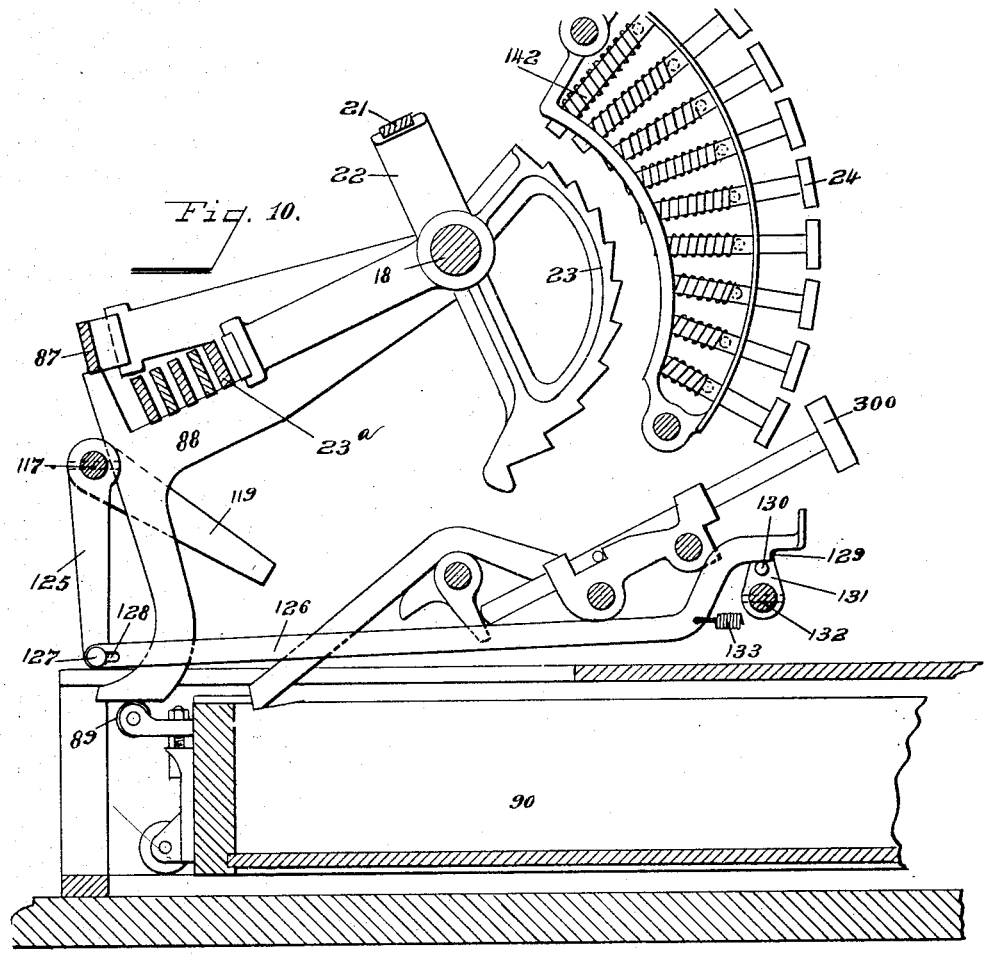
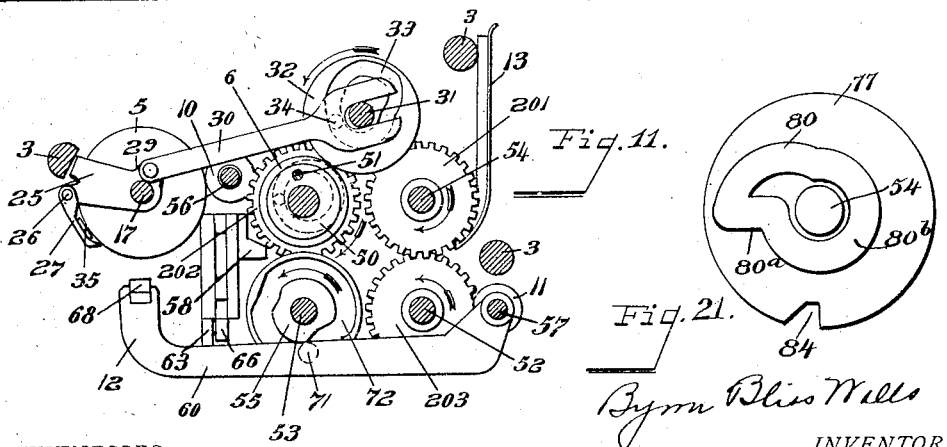
WITNESSES:
INVENTOR.
BY
ATTORNEYS.

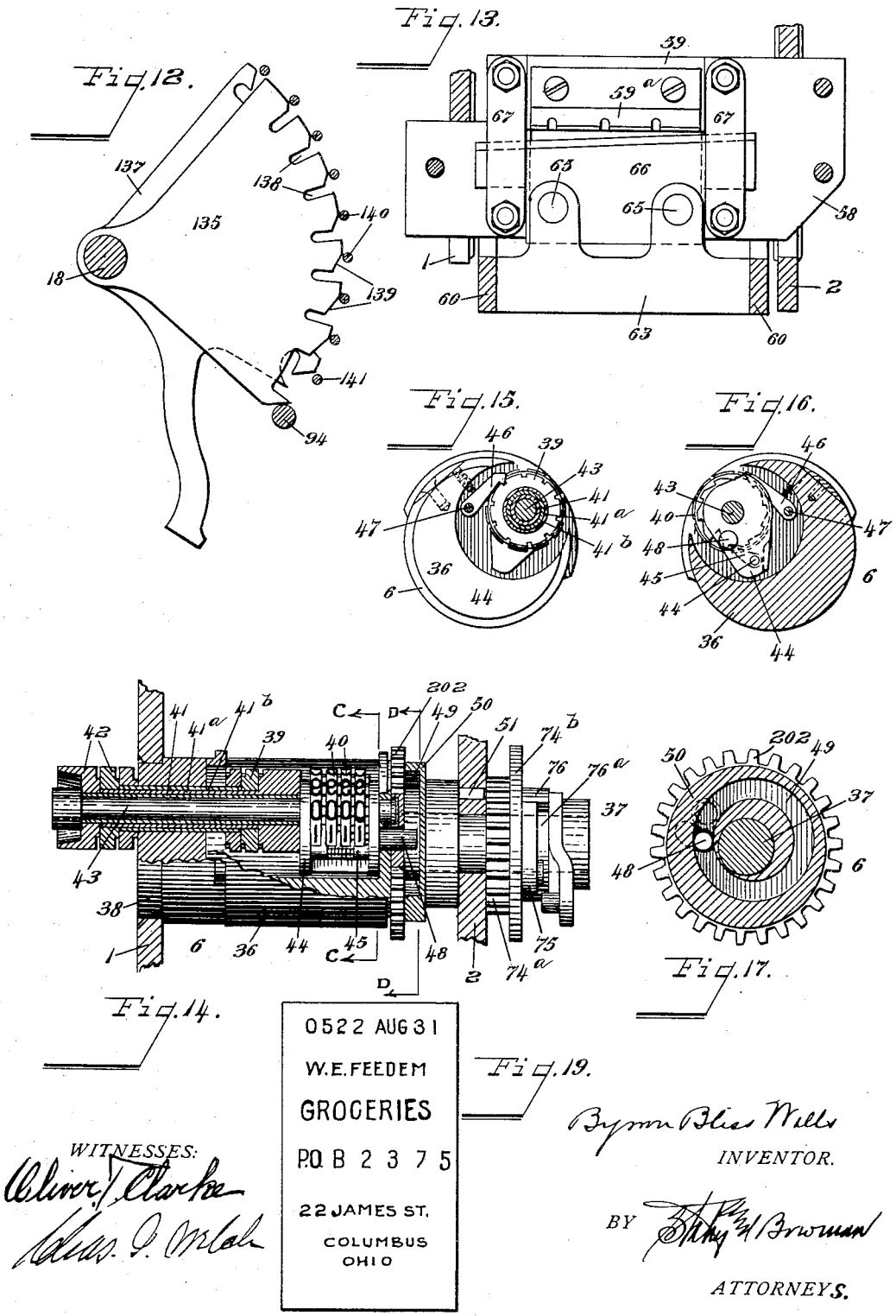

UNITED STATES PATENT OFFICE.

BYRON BLISS WELLS, OF COLUMBUS, OHIO, ASSIGNOR TO THE AMERICAN CASH REGISTER COMPANY, OF COLUMBUS, OHIO, A CORPORATION OF OHIO.

CHECK-PRINTER ATTACHMENT FOR CASH-REGISTERS.

1,151,747.     Specification of Letters Patent.     Patented Aug. 31, 1915.

Application filed June 30, 1910. Serial No. 569,833.

*To all whom it may concern:*

Be it known that I, BYRON BLISS WELLS, citizen of the United States, residing at Columbus, in the county of Franklin and State of Ohio, have invented certain new and useful Improvements in Check-Printer Attachments for Cash-Registers, of which the following is a specification.

This invention relates to a check printer attachment for cash adding machines.

An object of the invention is to provide means whereby the issuance of checks from the check printer may be controlled to correspond with certain conditions.

A further object of the invention is to provide means whereby a check may be issued by the check printer with all the transactions represented by the department keys of the cash adder, or with any one or more of them, or may be withheld entirely.

A further object of the invention is to provide means whereby the check printing devices are locked against operation until after a partial operation of the adding mechanism.

A further object of the invention is to provide means whereby the adding mechanism, after a partial operation of same, is prevented from further complete manipulation under certain conditions until after an operation of said printing devices.

A further object of the invention is to provide means whereby, after a partial operation of said adding mechanism, under conditions where the machine is set to issue checks, the issuance of the check may be optional with the proprietor; means being provided for permitting the complete operation of the said adding mechanism without first operating the printing devices.

A further object of the invention is to provide a machine of the character referred to in which all danger of erroneous operation and also manipulation is obviated, the operator being compelled to operate the machine in a proper manner to issue checks to conform with the transaction made upon the adder and also to conform with the controlling devices.

The invention consists in the constructions and combinations of parts hereinafter described and set forth in the claims.

In accompanying drawings: Figure 1 is a side elevation of a cash adder and check printer embodying my invention. Fig. 2 is a plan view of the same with a portion of the cash adder broken away. Fig. 3 is a side view of the department key-board of the cash adder and some of the locking mechanism of the printer. Fig. 4 is the front view of the same. Fig. 5 is a vertical section through the check printer, the section being taken on the line A—A of Fig. 2. Fig. 6 is a view of the right side of the check printer showing the locking devices in their normal position. Fig. 7 is a view of some of the parts of Fig. 6, showing the locking devices in operated position. Fig. 8 is an enlarged detail of a part of the locking devices. Fig. 9 is a detail of some of the parts for operating the printer. Fig. 10 is a vertical section through the cash register, showing the devices for locking the adding devices, and also the mechanism for controlling the locking devices under certain conditions. Fig. 11 is a vertical section through the printer on line B—B of Fig. 2. Fig. 12 is a section on the line E—E of Fig. 4. Fig. 13 is a section on a line F—F of Fig. 2, showing the check cutter. Fig. 14 is a detail of the date and numbering printing cylinder, a part thereof being broken away. Fig. 15 is a left end view of the cylinder barrel and date wheels shown in Fig. 14. Fig. 16 is a section on line C—C of Fig. 14. Fig. 17 is a section on line D—D of Fig. 14. Fig. 18 is a perspective view of the check printer controlling devices. Fig. 19 is a view of a printed check. Fig. 20 is a side view of the index lever of the optional device. Fig. 21 is a detail of the cam wheel shown in Fig. 8.

The type of cash adder to which I have shown my improvement applied is that of the well known drawer-operated type, but the invention is equally applicable to registers of other types such as crank-operated or key lever registers.

*Printing devices.*—The check printer which I have shown in the drawings is of a well known type, so far as the printing of the checks is concerned, but the construction thereof will be described as follows; 1 and 2, respectively are side plates or frames joined together by spacing rods 3; these frames carrying the operating parts of the printer, such as the date and consecutive number printing cylinder 6, the advertisement printing cylinder 7, the impression rolls 8 and 9 for the same, (all of which are geared together), the inking rolls 10 and 11 for same, the check printing wheels 5, the check impression hammer and paper cut-off 12 and the paper guide 13. The side plate 2 is secured to the bosses 14 on the side frame 15 of the cash adder.

The check printing type carrying wheels 5 are mounted loosely on their shaft 17, and each wheel has a pinion 16 concentrically secured thereto. Each of these pinions is meshed with a gear segment 19; all of said segments being mounted loosely on the main shaft 18 of the cash register. Riveted to each segment is an extension 20 (Fig. 2); these extensions being of graduated lengths and having secured to their outer ends straps 21 which extend into the cash adder and are there secured to upwardly projecting arms 22 (Fig. 10) on the hubs of graduated segments 23. These segments 23 are the usual segments found in a machine of this type, said segments having the usual rearwardly extending yokes 23$^a$ which are supported by the main operating lever 88 and drop when the cash drawer opens, their movement being limited by the depressed key 24 of any series. It will be understood that one type wheel 5 is provided for each cash denomination respectively upon the key board, as well as for the department bank of keys and that there will be one segment 19 for each type wheel and each segment 19 will be connected with the segment 23 corresponding thereto, so that as any segment 23 drops it will cause its corresponding type wheel 5 to move to correspond with the key of that denomination, or department bank depressed. Also loosely mounted on the shaft 17 is a U-shaped frame 25 (Figs. 2, 5 and 11) between the side arms of which extends a rod 26 on which swings an ink pad holder 27 having fingers 28 which extend rearwardly between the type wheels 5.

To a stud on the short arm 29 of the frame 25 is attached one end of a link 30 which extends rearwardly and is forked to straddle the shaft 31 which has its bearings in the side frames 1 and 2 and which carries a wheel 32 in which is cut a cam 33 into which extends a stud 34 on the link 30 so that when the wheel 32 revolves the frame 25 is caused to swing downwardly so that the ink pad 35 is brought under the type wheels 5, in which position it is struck by the impression hammer 12, inking the type, as will be described farther on. The frame 25 is then returned to its normal position as the cam wheel 32 completes its rotation; it being understood that said cam wheel is geared with the gearing previously referred so as to move therewith when operated in manner more fully described hereinafter. The dating and consecutive numbering cylinder consists of a barrel 36 (see Figs. 14 to 17 inclusive for detail), having a journal 37 integral therewith and extending through the side plate 2. The opposite end is fitted with a cap 38 which extends through the side plate 1.

The barrel 36 is chambered longitudinally to receive the dating and numbering type wheels 39 and 40 respectively; also the ratchet members for rotating the same. The dating wheels 39, three in number, are rigidly mounted on sleeves 41, 41$^a$ and 41$^b$ which project through the cap 38 and have secured to their outer ends correspondingly named and numbered wheels 42 by which said date type wheels 39 are set to their proper printing position. A shaft 43 extends through the sleeve 41 to the opposite end of the barrel 36 and on this shaft are loosely mounted consecutive numbering type wheels 40 and a U-shaped frame 44 which carries a pawl 45. The pawl 45 has a series of fingers which correspond to the number of type wheels and which engage ratchet teeth on the side of each wheel. These fingers are of graduated lengths and each ratchet wheel has a deep notch into which its finger drops so that the next finger may engage the ratchet of the wheel of the next higher denomination in a well known manner. Overthrow and backward movement of the wheels 39 and 40 are prevented by spring-pressed pawls 46 mounted on the rod 47 which lies parallel to the shaft 43 and is supported at its ends by the end of the barrel 36 and its cap 38. A stud 48 extends from the swinging pawl-carrying frame 44 through a slot in the end wall of the barrel 36 into a cam race 49 on the side of the cam wheel 50. The wheel 50 is concentric with barrel 36, but is held from rotation therewith by the pin 51 which projects from it into the side frame 2. The shape of the cam race 49 is such that as the barrel 36 makes a complete revolution the pawl frame 44 is caused to oscillate a distance sufficient to enable the pawls to move the unit wheel forward one-tenth of a revolution, and then return. The wheels may be set to zero by pressing thereon with one's fingers. On the barrel 36 may also be secured type for printing any other desired information or advertisement. Partly surrounding the barrel and cap are annular flanges which press on the paper near the edges whereby the paper is drawn from the roll in the usual manner during a portion of the rotation of the cylinder 6.

The rear cylinder 7 which prints the under side of the check consists of a shell adapted to rotate on a rod 52 which is supported in the plates 1 and 2 and upon which type may be secured.

Pressure on the type of both the front and rear cylinder 6 and 7 is provided by the impression rolls 8 and 9 which consist of steel shells covered with vulcanized rubber and rigidly mounted on shafts 53 and 54 respectively. The roll 8 is also provided at each end with a cam wheel 55, the purpose of which will be described more fully later.

Ink is supplied to the type on the cylinders 6 and 7 by means of the inking rolls 10 and 11 which consist of a shell of felt mounted on a tube through which extends the rods 56 and 57 and are supported in the side plates 1 and 2.

A stationary knife block 58 is secured at its ends to the plates 1 and 2 forward of the front cylinder 6 and is gained to receive a tool steel knife blade 59, which is fastened thereto.

The impression hammer 12 consists of two side bars 60 joined by cross-bars 61, 62, 63, and 64. The bars 60 are fulcrumed at their rear end on the rod 11. The bar 62 extends upwardly and from its rear face project two studs 65 upon which is supported the sliding knife 66. The knife 66 is kept in contact with the stationary knife 59 by guide bars 67. A paper guide 59$^a$ secured to the front of the knife 59 prevents the paper curling up behind the check type wheels. The cross bar 64 is grooved to receive a pad of felt 68 which is supported on a thin metal strip 69 which rests on the ends of adjusting screws 70. Rollers on studs 71 project inwardly from the side bars 60 of the hammer into cam races 72 in the side of the cam wheels 55. The cam races 72 are so formed that as the cylinder 8 revolves the hammer 12 is raised twice, the first time but slightly, when the ink pad is brought under the check type wheels, whereby the pad is forced into contact with the type and afterward it is raised sufficiently higher to press the check into contact with the type, the paper having been fed through before the latter hammer movement. The first movement of the hammer is not sufficient to bring the knife to the paper but on the second movement the check is cut off.

The operation of the date and consecutive numbering cylinder 6, the printing cylinder 7, the impression rolls 7 and 8; and the shaft 31 which carries the cam wheel 32, is caused by power applied to the hand lever 73 (Figs. 2 and 6), which is fulcrumed on the main shaft 18 and which has on its opposite end the gear segment 74 which meshes with the pinion 74$^a$ loosely mounted on the stem or journal 37 (see Fig. 9) to which is secured the disk 74$^b$ which carries the spring pressed pawl 75 which is adapted to drop in to the notch 76$^a$ formed on a collar 76 which is rigidly secured to the stem 37; the construction being such that the downward movement of the handle will cause a complete revolution of the parts referred to, but allowing the said parts to remain at rest upon the return movement of the handle.

As before stated all of these parts are geared together, some of the gears being indicated respectively by the characters 200, 201, 202, 203 and 204.

*Adder controlled locking devices for printer.*—Means are provided for normally preventing the operation of the printing devices until after a partial operation of the adding mechanism and also for preventing the operation of the register during the printing operation, the devices for accomplishing this being as follows: A cam wheel 77 is secured to the impression roller shaft 54 on the outside of the side frame 2. (See Figs. 2, 6, 7, and 8). A lever 81 (Figs. 2, 6 and 7) fulcrumed on a stud 82, projecting from the cash adder frame 15, has its rear end formed with a toe 83 which normally extends into the notch 84 in the cam wheel 77. The upper face of the upward end of the lever 81 lies tangentially against the periphery of the cam 85, which is loosely mounted upon the shaft 18 and which has a rearwardly projecting arm 86 to which is secured one end of the gravity bar 87; the opposite end of said bar being secured to a similar arm loose on the shaft 18 at other end of the cash register. The bar 87 is normally supported by the main operating lever 88 (see Fig. 10), which main lever 88 is fulcrumed on the shaft 18 with its lower end resting on the roller 89 on the cash drawer 90 in a manner common to adders of the type shown so that when the cash drawer opens the main lever will drop and permit the arm 86 to also drop and assume the position shown in Fig. 7, in which position the cam 85 will ride off of the upper end of the lever 81 and permit said lever to be rocked by the spring 81$^a$ so as to withdraw its toe 83 from the notch in the cam wheel 77 and thus unlock the printing mechanism. It will be observed that this unlocking of the printing devices does not take place until the cash drawer has reached practically its complete open position for its purpose hereinafter explained.

It will be observed that the end of the lever 81 and the shoulder formed by the cam 85 have corresponding beveled surfaces so that as the parts are returned to normal position the lever 81 will be rocked back to locking position and held there by said cam. This cannot take place, however, until said cam has completed its revolution and its notch 84 coincides with the toe 83 on said lever, so that the registering mechanism will be locked until the printing operation has been completed. After the adding mechanism has thus far been partially operated and the printing mechanism unlocked, additional means are also provided for preventing the complete operation of the adding mechanism until after the complete operation of the printing devices, but this means will be described hereinafter.

*Transaction controlled locking devices for*

*printing devices.*—Adjacent the cam wheel 77 previously described is a locking plate 78 having slotted openings through which project the stem 37 of the cylinder 6 and the end of shaft 54. (Figs. 3, 6, 7 and 8 for detail). This plate carries a laterally projecting stud 79 which projects into a cam race on the side of the cam wheel 77. The forward part of said cam race is provided with an abrupt shoulder $80^a$ so that when the printer is in its normal position, the stud 79 of the locking plate will lie just above the shoulder $80^a$, thus locking the shaft 54, and hence the printing devices, from movement. In order to unlock the parts, means are provided, upon the operation of the registering mechanism, for moving the locking plate rearwardly so as to bring its stud out of the path of movement of said cam shoulder, so that when the cam 77 is revolved the said stud will be free to pass into the concentric part $80^b$ of said cam race, the final quarter 80 of which, being eccentric, again forces the plate forwardly to the locking position. These unlocking means, however, are controlled by devices which coöperate with the keys 24 of the adding mechanism which determine the transactions; that is to say, the mechanism may be so set as to issue a check with all of the transactions represented upon the keyboard of the adder; it may be so set as to prevent the issuance of checks altogether; or it may be so set as to permit the issuance of checks with but certain of the transactions. First: Normally, the operation of unlocking the printer and the issuance of checks is under the control of setting devices associated with certain keys in the key board of the register which represent certain transactions such as "Received on account", "Charge", "Cash" etc., a setting device being provided in connection with each of these keys which determines, upon the depression of any key, whether or not the printer will be unlocked upon the first partial operation of the register mechanism; this condition being the "normal" condition of the lock controlling devices. Second: Means are also provided for throwing these key controlled devices out of operation altogether so that the printer will be unlocked upon each operation of the adder regardless of the key setting devices; this position of the devices being hereinafter referred to as the "on" position. Third: Means are also provided for entirely preventing the operation of the printer regardless of the keys and setting devices which coöperate therewith, so that it will be impossible to issue a check at all; this condition of the devices being hereinafter referred to as the "off" position. Fourth: In addition to the three conditions mentioned, there is also provided a device by which, after the partial operation of the register mechanism and after the printer has been unlocked thereby so as to permit its operation, the complete operation of said adding mechanism may be performed without operating the printer; this device being known and hereinafter referred to as the "optional" device. In connection with this condition, it may be stated here that after the registering mechanism has been partially operated and the printer unlocked, said registering mechanism is normally locked against further operation until after the complete operation of the printer, and this adder locking device will be described more fully hereinafter.

*Normal condition.*—Referring to Figs. 1, 2, 3 and 4, the bank of keys 24 shown is what is known as the "department" key bank, which represents such transactions as "No sale", "Paid out", "Charge", "Received on account", "Cash", and different departments of the store or different classes of merchandise a release key $24^a$ for releasing the other department keys that have been depressed being also included in this bank, this release key being in the present case the lower-most key of the series. These keys are of the ordinary kind found in registers of this type and are adapted to form stops when depressed for the segment 23 corresponding thereto so as to determine the movement of the parts to indicate on the register and print on the check characters corresponding to the key depressed. These keys are held in depressed position by the detent plate 137 (Fig. 12) which has hooks that engage laterally-extending pins 140 on the keys in a manner which is common in adders of this type. The simultaneous depression of two or more keys is prevented by means of an interference plate 135 located between the key frame 136 and detent plate 137; this interference plate being loosely mounted on the shaft 18 and is supported in its normal position by the rod 94. The forward edge is concentric to said shaft 18 and has radial slots 138 and inclined faces 139 leading thereto from the lateral pins 140 spaced in such a manner that two or more pins cannot enter their respective slots at the same time far enough to be retained by the hooks in the detent plate, with the single exception of the release key, (whose lateral pin is represented by 141, Fig. 12), which releases any depressed key of the series, which it does by raising the detent plate which permits the depressed key to spring out by the tension of its spring 142. This releasing may be accomplished at any time before the drawer release key 300 is depressed.

Located adjacent the left side of the key frame 136 is a plate 92, having its outer edge concentric to the shaft 18 and being supported on the rods 93 and 94 of the adder, these rods passing through slotted openings at each end of said plate as shown in Fig. 3.

A second plate 95 is rigidly secured to the outside of the adder frame 15 (Figs. 2, 4 and 18), and a third plate 96 lies adjacent to the plate 95 and is supported on shoulder screws 96ª which pass through slotted openings therein, permitting a slight end-wise movement, as shown in Fig. 1. The respective plates are provided with notches or oblong holes 96ᵇ, 95ª and 92ª near their outer peripheries, which notches and holes register with each other and receive sliding bars 97, one for each key of the bank. The inner end of each bar, when in normal position, projects a short distance inside the plate 92 but out of the line with the stems of the respective keys. These bars 97 have an endwise movement, the extent of which is controlled by the projections 97ª, 97ᵇ and 97ᶜ on their lower edges. When any one of these bars is pressed in to the limit allowed by the projection 97ª, the end of said bar will lie in the path of movement of a spline 98 on the under side of the key stem corresponding thereto, the inner end of the spline being beveled so that as the key is depressed it will bear downwardly on the bar 97, which, being fulcrumed on the stationary plate 95, will give to the plate 92 a downward movement. The plate 96 is drawn down against the tops of the respective bars 97 by a spring 99, (see Fig. 1) which serves to hold the said bars yieldably in adjusted position.

The lower end of the plate 92 rests against the upper edge of a controlling plate 100 (Fig. 3), a spring 100ª tending to hold said plates 100 and 92 in an upward position, and from the face of said plate 100 projects a lug 101, which, when in its normal position, lies in a notch in the forward end of a lever 102. The lever 102 is fulcrumed on the shouldered screw 103 in the adder frame 15 and has an arm 104 projecting down therefrom, the lower end of which arm normally extends a short distance forward of the stud 106 which projects laterally from the forward end of the locking plate 78 previously described. An arm 107 projects upwardly from said lever 102 on the free end of which is a pawl 108 pivoted at 108ᵇ the lower end of which pawl is normally but a short distance above the point of the cam projection 109 which extends laterally from the cam 85 previously described, so that when the lever 102 is rocked by the depression of a key as described above, the point of the pawl 108 is brought below the cam 109, and the arm 104 in close proximity to the stud 106. A boss 14 on the frame of the adder, against which the upper end of the arm 107 contacts forms a stop for the lever 102 which is normally swung upwardly by the spring 104ª. The operation of these devices is as follows.

By means of the bars 97 the proprietor is enabled to determine the character of the transactions upon which he desires to issue or not to issue checks. For instance he may want to offer a rebate on cash sales and therefore issue a check upon each cash sale; or he may want to issue checks on certain classes of goods represented by the department keys upon which there is a good profit, but not upon other classes of goods. When it is desired to issue a check on a certain transaction the bar 97 corresponding to the key representing that transaction is moved to the right so that the end thereof will be engaged by the spline 98 when the key is depressed and pushed downwardly whereupon the plate 92 is also pressed down against the lever 100, and the projection 101 thereon rock the lever 102 against the tension of its spring 104ª sufficient to bring the arm 104 into contact with the stud 106 of the locking plate, and also bring the point of the pawl 108 below the point of the cam 109. The lever 102 is now set so that as the gravity bar 87 is allowed to fall by the opening of the cash drawer of the register, the cam 109 will ride over the top of the pawl 108 and thus further rock the lever 102 and cause it to push the locking plate rearwardly and thus unlock the printing mechanism in the manner previously described. The printing mechanism may then be operated and in order to insure the operating of the printing mechanism before the completion of the registering operation or pushing in of the cash drawer, I have provided means, as before stated, for locking the registering mechanism until after the complete operation of the printing device, which means will now be described.

*Lock for registering mechanism.*—Upon the shaft 117, which extends across the back of the register and has its bearings in the side plates thereof, are two arms 118 and 119. A stud 120 (Fig. 6) projects laterally from the arm 118 into an angularly slotted opening 121 in the locking plate 78 previously described. As the gravity bar 87 falls to operated position the locking plate 78 will be thrust rearwardly as before described and the stud 120 on arm 118 will be at the forward end of slot 121, and so soon as said gravity bar rides over the arms 118 and 119 said stud will be raised to the highest point of said slot by the spring 122 whereby the shaft-bar 117 with the arms 118 and 119 are rotated upwardly into the path of the gravity bar and thereby locks the same and likewise prevents the closing of the cash drawer until the sliding locking plate 78 is again moved forward by the cam 80 and the arms 118 and 119 depressed by the inclined face of the slot 121 pressing on the stud 120.

*Off position of printer lock operating devices.*—Means are provided for throwing out of operation the operating devices for the printer lock so that the printer will remain locked under all conditions, irrespective of the key operated controlling means, so that it will be impossible to issue a check with any transaction whatsoever. The plate 100, it will be seen, is extended downwardly and its free end pivoted on a pin 111 which projects eccentrically from the end of the short shaft 112 which has its bearings in the casing 113 and a side plate of the register. On the outer end of the shaft 112 is a lever 114 by which the shaft 112 may be turned to the desired position. When the pin 111 is in mid position, as is shown in Fig. 3, the conditions of operation are normal, as first described; that is, the issuance of checks is under the control of the key operated devices. By turning the shaft to the left, the pin 111 will thrust the projection 101 on the plate 100 upwardly above the notch in the lever 102 where it will manifestly have no effect on the lever 102 when the plate 92 is forced downwardly by the depression of the key, and consequently the cam 109 will pass under the pawl 108 which yields upwardly against the tension of its spring 108ª thus leaving the printer in locked condition. It will be seen also in this case that the locking arms 118 and 119 will be held in an inoperative position by reason of the fact that the locking plate 78 remains stationary so that the cash drawer of the machine may be pushed back to closed position irrespective of any operation of the printing device.

*On position of printer lock operating devices.*—By turning the shaft 112 in the opposite direction it will be seen that the plate 100 is drawn downwardly and with it the lever 102 so that the projecting arm 104 will lie adjacent the stud 106 on the locking lever and the point of the pawl 108 will be below the cam 109 so that the printer will be unlocked at each operation of the register regardless of the positions of the operated bars 97. Such a position of the operating devices is desirable when the proprietor wishes to issue a check with each transaction.

*Optional device.*—From the description so far, it has been seen that whenever the printer devices are unlocked by the first operation of the adding mechanism, said adding mechanism becomes automatically locked against further operation until after the complete operation of the printer. It has been further seen from the description that in cases where it is not desired to issue checks upon any transaction, the printer remains locked and the adding mechanism unlocked. In other words, after the first partial operation of the adding mechanism, either the printer becomes unlocked and the adding mechanism locked or the printer remains locked and the adding mechanism is prevented from becoming locked; that is, either one of the two is locked. In addition to these conditions I have further provided means whereby after the first operation of the adding mechanism the printing devices may be operated or not at the option of the operator, and in order to accomplish this I have provided means for preventing the lock for the adding mechanism from moving to locking position. This optional device is best shown in Figs. 2 and 10.

It will be remembered that the shaft 117 carries the arms 118 and 119 which form bars against the return to normal position of the gravity bar 87 and thus lock the adding mechanism against complete operation until after an operation of the printer, which printing operation causes the locking plate 78 to rock said arms 118 and 119 out of the path of the movement of said gravity bar 87. The shaft 117 also has a depending arm 125, the lower free end of which is connected to the bar 126 by the stud 127 which extends through the slotted opening 128 in said bar. The bar 126 extends forwardly and has a shoulder 129 which is adapted to be engaged by the stud 130 which extends from the arm 131 rigidly fixed to the rod 132. The normal position of the parts is that shown in Fig. 10 in which the shoulder 129 is out of engagement with said stud, being held in this position by the spring 133, and in this position the shaft 117 is free to rock so as to permit the arms there on to lock the gravity bar.

By pressing the rod 126 rearwardly, the forward end of the slot 128 is brought against the end of the stud 127 and this prevents the oscillation of the shaft 117 and arms 118 and 119, so that the gravity bar 87 will not be locked thereby and is not prevented from immediately returning to normal position, so that the operator may at his option either operate the check printer and to issue a check or complete the full operation of the adding mechanism independent of said printer and without issuing the check.

It will be understood of course that this optional device does not interfere in any way with the issuance of checks upon separate transactions; that is to say, even though the optional device was in operative condition to prevent the locking of the register mechanism, the printer locking device would still be under the control of the bars 97 so as to unlock the printer or leave it locked according as to how the said bars 97 are set.

*Make-sure device for printer lock.*—In order to insure the proper return to locking position of the locking plate 78 after each operation of the machine, independent of any operation of the printer, I have provided means for positively throwing said plate forwardly so as to bring its stud 79 in proper locking relation with the shoulder 80ᵃ on the cam wheel 77. One of the devices for accomplishing this purpose is shown in Figs. 3 and 6. A plate 400 (Fig. 6) is slidingly mounted upon headed screws 401 secured in the frame of the adder and which extend through slotted openings in said plate. The rear end of this plate has an upturned projection 402 which stands in line with the stud 106 on the forward end of the locking plate 78. A spring 403 normally holds this plate in its rearmost position. The forward end of the plate also has an upturned projection 404 which stands in the path of movement of the pin 405 secured to the shaft 112. When the lever 114 is turned to off position this pin 405 will strike the projection 404 and move the plate 400 forwardly, thus causing the locking plate 78 to be likewise moved forwardly in locking position by reason of the contact of the projection 402 with the stud 106. It will be understood that the devices thus described operate only when the controlling index lever 114 is turned to off position.

In addition to the above device, I have also provided means for insuring the return of this locking plate 78 to locking position at end of each complete operation of the machine. In Fig. 6, 500 represents a lever pivoted at 501 to the adder frame and having its upper end standing adjacent the rear end of the said locking plate. After the cash drawer opens it will be seen that the locking plate 78, upon its rearward movement to unlocking position will swing its lever 500 so as to bring its lower end into the path of the cash drawer so that as the cash drawer is again closed it will swing said lever back to normal position and cause it to also move the locking plate 78 to its locking position in case said locking lever should not have been returned to said position by the usual means heretofore described.

Having thus described my invention, I claim,

1. In a combined check printer and cash register, a printing mechanism and an adder operating mechanism, a locking mechanism for said printing mechanism, a series of keys associated with said adder operating mechanism for determining the movement of certain parts of said printing mechanism, and a series of independent manipulative selective devices associated with said keys, one device to each key, capable of being moved into and out of operative relation with said keys, together with connections from said devices to said locking mechanism, whereby the operation of the printing mechanism may be controlled.

2. In a combined check printer and cash register, a printing mechanism and an adder operating mechanism, a locking mechanism for normally locking said printing mechanism, a series of keys associated with said adder operating mechanism for determining the movement of certain parts of said printing mechanism, and a series of independent manipulative selective devices associated with certain of said keys, one device for each key, capable of being moved into and out of operative relation with the same, together with connections from said devices to said locking mechanism, whereby the operation of the printing mechanism may be controlled.

3. In a combined check printer and cash register, a printing mechanism and an adder operating mechanism, a series of devices for determining the movement of certain parts associated with said mechanisms, locking mechanism for said adder operating and printing mechanisms, and a series of manipulative selective devices associated with said determining devices and capable of being moved into and out of operative relation with the same, together with connections from the same to said locking mechanism whereby the operation of the printing mechanism may be controlled.

4. In a combined check printer and cash register, a printing mechanism and an adder operating mechanism, a series of keys representing different transactions, locking mechanism for normally locking said printing mechanism, and a series of manipulative selective devices associated with said keys, one device for each key, and capable of being moved into and out of operative relation with the same, for controlling said locking mechanism to cause the operation of said printing mechanism to be controlled.

5. In a combined check printer and cash register, a printing mechanism and adder operating parts, a series of keys representing different transactions for determining the movement of certain parts associate with said mechanism and operating parts, locking devices for said printer and a manipulative selective controlling device for said locking devices associated with each key so that the operation of the printing mechanism may be controlled by the operated key, substantially as specified.

6. In a combined check printer and cash register, a printing mechanism and adder operating parts, a series of keys representing different transactions for determining the movement of certain parts associated with said mechanism and operating parts, locking devices for the respective mechanisms, a controlling device for said locking device associated with each key, and means whereby the setting of any controlling device will cause the operation of its corresponding key to unlock the printing mechanism and lock the adder operating parts after a partial operation of said operating parts, substantially as specified.

7. In a combined check printer and cash register, a printing mechanism and an adder operating mechanism, one of said mechanisms being normally-locked and the other mechanism being normally-unlocked, special transaction devices associated with the normally-unlocked mechanism, and manipulative selective devices associated with the special transaction devices whereby the operation of the normally unlocked mechanism may effect the unlocking of the normally-locked mechanism.

8. In a combined check printer and cash register, a printing mechanism and an adder operating mechanism, one of said mechanisms being normally-locked and the other mechanism normally unlocked, manipulative selective means whereby the operation of the normally-unlocked mechanism effects the unlocking of the normally-locked mechanism, and means whereby the normally-unlocked mechanism becomes locked until after an operation of the normally-locked mechanism, substantially as specified.

9. In a combined printer and cash register, a printing mechanism and an adder operating mechanism, one of said mechanisms being normally locked and the other being normally unlocked, independent means for operating the respective mechanisms, manipulative selective devices associated with the normally-unlocked mechanism whereby when said mechanism is operated the unlocking of the normally-locked mechanism may be effected, and means whereby the normally-unlocked mechanism becomes locked against complete operation until after an operation of the normally-locked mechanism, substantially as specified.

10. In a combined check printer and cash register, a printing mechanism and an adder operating mechanism, one of said mechanisms being normally-locked and the other mechanism normally-unlocked, manipulative selective controlling devices associated with the normally-unlocked mechanism whereby upon the operation of said mechanism the unlocking of the normally-locked mechanism may be effected through the medium of said device, substantially as specified.

11. In a combined check printer and cash register, a printing mechanism and an adder operating mechanism, one of said mechanisms being normally-locked and the other normally-unlocked, manipulative selective controlling devices associated with the normally-unlocked mechanism whereby the operation of said mechanism may unlock the normally-locked mechanism, and means whereby the normally-unlocked mechanism becomes locked until after an operation of the normally-locked mechanism, substantially as specified.

12. In a combined printer and cash register, a printing mechanism and an adder operating mechanism, one of said mechanisms being normally-locked and the other normally-unlocked, independent means for operating the respective mechanisms, manipulative selective controlling devices associated with the normally-unlocked mechanism whereby when said mechanism is operated the unlocking of the normally locked mechanism may be effected, and means whereby the normally-unlocked mechanism becomes locked against complete operation until after an operation of the normally-locked mechanism, substantially as specified.

13. In a combined check printer and cash register, a printing mechanism and an adder operating mechanism, one of said mechanisms being normally-locked and the other normally-unlocked, a series of keys representing different transactions for determining the movement of certain parts associated with said mechanisms, manipulative selective controlling devices associated with said keys whereby upon the operation of the normally-unlocked mechanism the unlocking of the normally-locked mechanism may be effected, substantially as specified.

14. In a combined check printer and cash register, a printing mechanism and an adder operating mechanism, one of the said mechanisms being normally-locked and the other normally-unlocked, a series of keys representing different transactions for determining the movement of certain parts associated with the said mechanisms, manipulative selective controlling devices associated with said keys whereby upon the operation of the normally-unlocked mechanism the unlocking of the normally-locked mechanism may be effected, and means whereby when said normally-locked mechanism becomes unlocked said normally-unlocked mechanism becomes locked until after the operation of the normally-locked mechanism, substantially as specified.

15. In a combined check printer and cash register, printing devices, adder operating parts, a lock for said printing devices, means controlled by the partial operation of said adder operating parts for releasing said lock, and manipulative selective devices for controlling said lock releasing means, substantially as specified.

16. In a combined check printer and cash register, normally-locked printing devices, adder operating mechanism, means controlled by the operation of said adder operating mechanism for unlocking said printing devices at one point in the operation of said operating mechanism and for restoring said printing devices to locked condition at the completion of the operation of said operating mechanism, and manipulative selective devices for governing said lock controlling means, substantially as specified.

17. In a combined check printer and cash register, normally-locked printing devices, adder operating mechanism, means for operating said printing devices independent of said mechanism, means for unlocking said printing devices by the operation of said operating mechanism, and manipulative selective devices for governing said locking means, substantially as specified.

18. In a combined check printer and cash register, normally-locked printing devices, adder operating mechanism, means for operating said printing devices independent of said mechanism, means for unlocking said printing devices at one point in the operation of the operating mechanism and for restoring said printing devices to locked condition at the completion of the operation of said operating mechanism, and manipulative selective devices for governing said unlocking means, substantially as specified.

19. In a combined check printer and cash register, normally-locked printing devices, adder operating mechanism, means for unlocking said printing devices and for locking said operating mechanism at a certain point in the operation of said operating mechanism, and means for unlocking said operating mechanism by the operation of said printing devices, and manipulative selective devices for controlling said unlocking means, substantially as specified.

20. In a combined check printer and cash register, normally-locked printing devices, adder operating mechanism, means for operating said printing devices independent of said mechanism, manipulative selective means for unlocking said printing devices and for locking said operating mechanism at a certain point in the operation of said operating mechanism, and means for unlocking said operating mechanism by the operation of said printing devices, substantially as specified.

21. In a combined check printer and cash register, normally locked printing devices, adder operating mechanism, manipulative selective means for unlocking said printing devices and for locking said operating mechanism at a certain point in the operation of the operating mechanism, means for unlocking said operating mechanism by the operation of said printing devices, and means upon the complete operation of said operating mechanism for restoring said printing devices to locked condition, substantially as specified.

22. In a combined check printer and cash register, normally-locked printing devices, adder operating mechanism, means for operating said printing devices independent of said operating mechanism, manipulative selective means for unlocking said printing devices and for locking said operating mechanism at a certain point in the operation of said operating mechanism, means for unlocking said operating mechanism by the operation of said printing devices, and means upon the complete operation of said operating mechanism for restoring said printing devices to locked condition, substantially as specified.

23. In a combined check printer and cash register, normally-locked printing devices, adder operating mechanism, and manipulative selecting controlling devices associated with said operating mechanism whereby the unlocking of said printing device may be effected upon the operation of said operating mechanism, substantially as specified.

24. In a combined check printer and cash register, normally-locked printing devices, adder operating mechanism, and a series of manipulative selective controlling devices associated with said operating mechanism whereby the unlocking of said printing devices may be effected by said operating mechanisms, substantially as specified.

25. In a combined check printer and cash register, normally-locked printing devices, adder operating mechanism, said operating mechanism having a series of keys representing different transactions, and a series of manipulative selective controlling devices associated with said keys whereby upon the operation of said operating mechanism the unlocking of the printing devices may be controlled by the controlling device corresponding to the operated key, substantially as specified.

26. In a combined check printer and cash register, normally-locked printing device, adder operating mechanism, means for operating said printing devices independent of said operating mechanism, and manipulative selective controlling devices associated with said operating mechanism whereby the unlocking of said printing devices is effected upon the operation of said operating mechanism, substantially as specified.

27. In a combined check printer and cash register, normally-locked printing device, adder operating mechanism, means for operating said printing devices, independent of said operating mechanism, and a series of manipulative selective controlling devices associated with said operating mechanism whereby the unlocking of said printing devices is effected upon the operation of said operating mechanism, substantially as specified.

28. In a combined check printer and cash register, normally locked printing devices, adder operating mechanism, means for operating said printing devices independent of said operating mechanism, said operating mechanism having a series of keys representing different transactions and a series of manipulative selective controlling devices associated with said keys whereby upon the operation of said operating mechanism the unlocking of the printing devices may be controlled by the operated keys, substantially as specified.

29. In a combined check printer and cash register, normally locked printing devices, adder operating mechanism, manipulative selective controlling devices associated with said adding mechanism whereby the unlocking of said printing device may be effected upon the operation of said operating mechanism, and means whereby said operating mechanism may be locked until after an operation of said printing device, substantially as specified.

30. In a combined check printer and cash register, normally locked printing devices, adder operating mechanism, means for operating said printing devices independent of said operating mechanism, manipulative selective controlling devices associated with said operating mechanism whereby the unlocking of said printing devices may be effected upon the operation of said operating mechanism, and means whereby said operating mechanism may be locked until after an operation of said printing devices, substantially as specified.

31. In a combined check printer and cash register, normally locked printing devices, adder operating mechanism, a series of manipulative selective controlling devices associated with said adder operating mechanism whereby the unlocking of said printing devices may be effected by said operating mechanism, and means whereby said operating mechanism may be locked until after an operation of said printing devices, substantially as specified.

32. In a combined check printer and cash register, normally locked printing devices, adder operating mechanism, means for operating said printing devices independent of said adder operating mechanism, a series of manipulative selective controlling devices associated with said operating mechanism whereby the unlocking of said printing devices may be effected by said operating mechanism during the operation thereof, and means whereby said operating mechanism may be locked against further movement until after the operation of said printing devices, substantially as specified.

33. In a combined check printer and cash register, normally locked printing devices, adder operating mechanism, said operating mechanism having a series of keys representing different transactions, a series of controlling devices associated with said keys whereby upon the operation of said operating mechanism the unlocking of the printing devices may be controlled by the operated key, and means whereby said operating mechanism may be locked against complete operation until after the operation of said printing device, substantially as specified.

34. In a combined check printer and cash register, normally locked printing devices, adder operating mechanism, means for operating said printing devices independent of said operating mechanism, said adder operating mechanism having a series of keys representing different transactions, a series of controlling devices associated with said keys whereby upon the operation of said operating mechanism the unlocking of the printing devices may be controlled by the operated key, and means whereby said operating mechanism may be locked against complete operation until after the operation of said printing device, substantially as specified.

35. In a combined check printer and cash register, normally locked printing devices, adder operating mechanism, manipulative selective means whereby said printing devices may be unlocked under certain conditions by the partial operation of said operating mechanism, and means whereby when said printing devices are unlocked said operating mechanism becomes locked against further movement until after the operation of said printing devices, substantially as specified.

36. In a combined check printer and cash register, normally locked printing devices, adder operating mechanism, a series of manipulative selective controlling devices associated with said operating mechanism whereby the locking of said printing devices may be effected under certain conditions and means whereby when said printing devices are unlocked further movement of said operating mechanism is prevented until after an operation of said printing devices, substantially as specified.

37. In a combined check printer and cash register, normally locked printing devices, adder operating mechanism, said operating mechanism having a series of keys representing different transactions, a series of controlling devices associated with said keys whereby the unlocking of the printing devices may be effected by the operation of said operating mechanism as determined by the controlling device corresponding to the operated key, means whereby when said printing devices are unlocked the operating mechanism becomes locked against further movement until after an operation of said printing devices, substantially as specified.

38. In a combined check printer and cash register, normally locked printing devices, adder operating mechanism, means for operating said printing devices independent of said operating mechanism, manipulative selective means associated with said operating mechanism by which said printing devices may be unlocked by the operation of said operating mechanism, means whereby when said printing devices are unlocked said operating mechanism becomes locked against further movement until after an operation of said printing devices, substantially as specified.

39. In a combined check printer and cash register, normally locked printing devices, adder operating mechanism, means for operating said printing devices independent of said operating mechanism, manipulative selective means whereby upon the operation of said operating mechanism said printing devices may be unlocked, and means whereby when said printing devices are unlocked further movement of said operating mechanism is prevented until after the operation of said printing devices, substantially as specified.

40. In a combined check printer and cash register, a printing mechanism and an adder operating mechanism, a series of keys representing different transactions for determining the movements of said mechanisms, manipulative selective controlling devices associated with said keys for controlling the operation of the printing mechanism, and a second controlling device for controlling said printing mechanism independent of the operation of said key controlling devices, substantially as specified.

41. In a combined check printer and cash register, a printing mechanism and an adder operating mechanism, controlling devices for controlling the operation of said printing mechanism upon each operation of the machine, and a second controlling device for said printing mechanism, said second controlling device when in normal position permitting said first mentioned controlling device to govern the operation of said printing mechanism and in its other positions to either permit or prevent the operation of said printing mechanism independent of the position of the first mentioned controlling device, substantially as specified.

42. In a combined check printer and cash register, a printing mechanism and adder operating mechanism, a series of keys representing different transactions for determining the movement of certain parts associated with said mechanisms, manipulative selective controlling devices associated with said keys for controlling the operation of said printing mechanism, a second controlling device for said printing mechanism, said second controlling device when in normal position permitting the printing mechanism to be governed by said key controlling devices but being adapted in different positions to either permit or prevent the operation of said printing mechanism independent of the position of said key controlling devices, substantially as specified.

43. In a combined check printer and cash register, a printing mechanism and an adder operating mechanism, a series of keys representing different transactions for determining the movement of certain parts associated with said mechanisms, a series of manipulative selective controlling devices one for each key for controlling the operation of said printing mechanism to permit its operation only upon the depression of a key whose controlling device has been set, and a second controlling device for said printing mechanism which when in normal position permits said printing mechanism to be governed by said key controlling devices but which when in different positions will either permit or prevent the operation of said printing mechanisms, substantially as specified.

44. In a combined check printer and cash register, a printing mechanism and an adder operating mechanism, locking devices for said printing mechanism, a series of keys for determining the movement of certain parts associated with said mechanisms, manipulative selective controlling devices for said locking devices associated with said keys whereby the operation of said printing mechanism is permitted only upon depression of a key whose controlling device has been set, and a main controlling device for said printer locking devices, said main controlling device when in normal position permitting said printer locking devices to be controlled by said key controlling devices but being adapted to entirely prevent or permit the unlocking of said printing mechanism upon each operation of the machine, substantially as specified.

45. In a combined check printer and cash register, a printing mechanism and an adder operating mechanism, controlling devices for controlling the operation of the printing mechanism, means for locking the operating mechanism after a partial operation thereof under certain conditions, and an additional controlling device for throwing said locking device out of operation, substantially as specified.

46. In a combined check printer and cash register, a printing mechanism and an adder operating mechanism, a locking device for said printing mechanism, means for releasing said printer locking device after a partial operation of said operating mechanism, a locking device for the operating mechanism adapted to be thrown into operation after a partial operation thereof, and a controlling device for throwing said register locking device out of operation, substantially as specified.

47. In a combined check printer and cash register, a printing mechanism and an adder operating mechanism, a series of keys representing different transactions for determining the movement of certain parts associated with said mechanisms, manipulative selective controlling devices associated with said keys for controlling the operation of said printing mechanism, means for compelling the operation of said printing mechanism under certain conditions as determined by said controlling devices, and a second controlling device for throwing said compelling means out of operation, substantially as specified.

48. In a combined check printer and cash register, a printing mechanism and an adder operating mechanism, a series of keys representing different transactions for determining the movement of certain parts associated with said mechanisms, controlling devices associated with said keys for controlling the operation of said printing mechanism after a partial operation of said adding mechanism, a locking device for said adding mechanism adapted to lock the same at end of its partial movement under certain conditions as determined by said controlling devices, means operated by the printer for releasing said lock, and an additional controlling device for throwing said register lock out of operation, substantially as specified.

49. In a combined check printer and cash register, a printing mechanism and an adder operating mechanism, a series of devices for determining the movement of a portion of said printing mechanism, means whereby the operation of each of said mechanisms may be prevented, and manipulative selective means adapted to be thrown into or out of operative relation with said determining devices for controlling said preventive means.

50. In a combined check printer and cash register, a printing mechanism and an adder operating mechanism, a series of keys representing different transactions for determining the movement of certain parts associated with said mechanisms, means for preventing the operation of said mechanisms under certain conditions, and manipulative selective controlling devices associated with said keys for controlling said preventive means, substantially as specified.

51. In a combined check printer and cash register, a printing mechanism and an adder operating mechanism, one of said mechanisms being normally in inoperative position and the other mechanism normally in operative position, a series of devices for determining the movement of parts of said printing mechanism, and a series of manipulative selective devices adapted to be thrown into or out of operative relation with said determining devices so that when any one of said selective devices is in operative relation with its corresponding determining device, the operation of the normally operative mechanism will place the normally inoperative mechanism in operative condition.

52. In a combined check printer and cash register, a printing mechanism and an adder operating mechanism, one of said mechanisms being normally in inoperative condition, and the other mechanism normally in operative condition, manipulative selective devices whereby upon the partial operation of the normally-operative mechanism the normally-inoperative mechanism is placed in operative condition, and means for preventing the complete operation of the normally-operative mechanism until after the operation of the normally-inoperative mechanism, substantially as specified.

53. In a combined check printer and cash register, a printing mechanism and an adder operating mechanism, one of said mechanisms being normally in inoperative condition and the other normally in operative condition, a series of keys representing different transactions for determining the movement of certain parts associated with said mechanisms, and manipulative selective devices associated with said keys whereby upon the operation of the normally operative mechanism the normally inoperative mechanism is placed in operative condition.

54. In a combined check printer and cash register, a printing mechanism and an adder operating mechanism, one of said mechanisms being normally in inoperative condition and the other mechanism normally in operative condition, a series of keys representing different transactions for determining the movement of certain parts associated with said mechanisms, manipulative selective devices associated with said keys whereby upon the operation of the normally-operative mechanism the normally-inoperative mechanism is placed in operative condition, and means for preventing the further operation of said normally-operative mechanism until after an operation of the normally-operative mechanism, substantially as specified.

55. In a combined check printer and cash register, normally-inoperative printing mechanism, an adder operating mechanism, means for operating said printing mechanism independent of said adder operating mechanism, manipulative selective devices for placing said printing mechanism in operative condition and said adder operating mechanism in inoperative condition at a certain point in the operation of said adder operating mechanism, and means for placing said adder operating mechanism in operative condition upon the operation of said printing mechanism.

56. In a combined check printer and cash register, normally-inoperative printing mechanism, adder operating mechanism, manipulative selective devices for placing said printing mechanism in operative condition and said adder operating mechanism in inoperative condition at a certain point in the operation of said adder operating mechanism, means for restoring said adder operating mechanism to operative condition upon the operation of said printing mechanism, and means upon the complete operation of said adder operating mechanism for restoring said printing mechanism to inoperative condition, substantially as specified.

57. In a combined check printer and cash register, normally-inoperative printing mechanism, adder operating mechanism, means for operating said printing mechanism independent of said adder operating mechanism, manipulative selective devices for placing said printing mechanism in operative condition and said adder operating mechanism in inoperative condition at a certain point in the operation of the adder operating mechanism, means for restoring said adder operating mechanism to operative condition upon the operation of said printing mechanism, and means upon the complete operation of said adder operating mechanism for restoring said printing mechanism to inoperative condition.

58. In a combined check printer and cash register, normally inoperative printing mechanism, adder operating mechanism, and a series of manipulative selective controlling devices capable of being thrown into or out of operative relation with certain parts associated with said adder operating mechanism whereby, when in operative relation therewith, said printing mechanism will be placed in operative condition upon the operation of said adder operating mechanism.

59. In a combined check printer and cash register, normally inoperative printing mechanism, adder operating mechanism, said adder operating mechanism having a series of keys representing different transactions and a series of adjustable selective controlling devices associated with said keys whereby upon the operation of said adder operating mechanism the placing of said printing mechanism in operative condition may be controlled by the controlling device corresponding to the operated key, substantially as specified.

60. In a combined printer and cash register, a printing mechanism and an adder operating mechanism, a series of keys representing different transactions, and a series of adjustable selective controlling devices corresponding to said keys and capable of being shifted into and out of operative relation therewith for controlling the operation of said printing mechanism, substantially as specified.

61. In a combined printer and cash register, a normally inoperative printing mechanism and an adder operating mechanism, said adder operating mechanism having associated therewith a series of keys representing different transactions, adjustable controlling devices associated with said keys, and capable of being shifted into and out of operative relation therewith, and means whereby the operation of any key whose controlling device has been set will cause the printing mechanism to be placed in operative condition, substantially as specified.

62. In a combined printer and cash register, normally inoperative printing mechanism and an adder operating mechanism, said adder operating mechanism having associated therewith a series of keys representing different transactions, mechanism for controlling the operation of said printing mechanism, said controlling mechanism comprising adjustable selective devices corresponding with said keys and capable of being shifted into and out of operative relation therewith, and means for causing said controlling mechanism to place said printing mechanism in operative condition when any key whose selective device has been set has been operated, substantially as specified.

63. In a combined printer and cash register, normally inoperative printing mechanism and an adder operating mechanism, said adder operating mechanism having associated therewith a series of keys representing different transactions, mechanism for controlling the operation of said printing mechanism, said controlling mechanism comprising selective devices corresponding with said keys, means for causing said controlling mechanism to place said printing mechanism in operative condition when any key whose selective devices has been set has been operated, and a secondary controlling device for throwing said controlling mechanism out of operation irrespective of the position of said selective devices, substantially as specified.

64. In a combined printer and cash register, a normally inoperative printing mechanism, and an adder operating mechanism, said adder operating mechanism having associated therewith a series of keys representing different transactions, mechanism for controlling the operation of the printing mechanism, said controlling mechanism comprising selective devices associated with said keys and capable of being shifted into and out of operative relation therewith, and means operated by a moving part of said adder operating mechanism to cause said controlling mechanism to place said printing mechanism in operative position when any key whose selective device has been set is operated, substantially as specified.

65. In a combined printer and cash register, a normally inoperative printing mechanism and an adder operating mechanism, said adder operating mechanism having associated therewith a series of keys representing different transactions, mechanism for controlling the operation of the printing mechanism, said controlling mechanism comprising selective devices associated with said keys, means operated by a moving part of said adder operating mechanism to cause said controlling mechanism to place said printing mechanism in operative position when any key whose selective device has been set is operated, and a secondary controlling device for throwing said controlling mechanism out of operation irrespective of the position of said selective devices, substantially as specified.

In testimony whereof, I have hereunto set my hand.

BYRON BLISS WELLS.

Witnesses:
G. M. GRIDLEY,
P. A. CHERRY.

Copies of this patent may be obtained for five cents each, by addressing the "Commissioner of Patents, Washington, D. C."